United States Patent
Heilakka (10) Patent No.: US 8,260,814 B2
(45) Date of Patent: Sep. 4, 2012

(54) METHOD AND AN ARRANGEMENT FOR CONCURRENCY CONTROL OF TEMPORAL DATA

(76) Inventor: Erkki Heilakka, Helsinki (FI)

( * ) Notice: Subject to any disclaimer, the term of this patent is extended or adjusted under 35 U.S.C. 154(b) by 314 days.

(21) Appl. No.: 12/562,059

(22) Filed: Sep. 17, 2009

(65) Prior Publication Data

US 2011/0066604 A1    Mar. 17, 2011

(51) Int. Cl.
G06F 7/00 (2006.01)
G06F 17/30 (2006.01)

(52) U.S. Cl. .......................... 707/787; 707/788; 707/955

(58) Field of Classification Search .................. 707/610, 707/620, 624, 704, 787, 788, 955
See application file for complete search history.

(56) References Cited

U.S. PATENT DOCUMENTS

| | | | | |
|---|---|---|---|---|
| 5,153,848 A * | 10/1992 | Elkind et al. | ................. | 708/503 |
| 5,497,463 A * | 3/1996 | Stein et al. | .................... | 709/203 |
| 5,524,218 A * | 6/1996 | Byers et al. | ................... | 710/305 |
| 5,956,741 A * | 9/1999 | Jones | ................ | 711/1 |
| 6,094,672 A * | 7/2000 | Willie et al. | ................. | 709/202 |
| 7,403,890 B2 * | 7/2008 | Roushar | ............................ | 704/9 |
| 2004/0076186 A1 * | 4/2004 | Chen et al. | .................... | 370/503 |
| 2005/0169536 A1 * | 8/2005 | Accomazzi et al. | .......... | 382/228 |
| 2007/0204078 A1 * | 8/2007 | Boccon-Gibod et al. | ....... | 710/54 |
| 2009/0017851 A1 * | 1/2009 | Li et al. | ......................... | 455/502 |

* cited by examiner

*Primary Examiner* — Phong Nguyen (74) *Attorney, Agent, or Firm* — Fasth Law Officdes; Rolf Fasth (57) ABSTRACT

The method is for granting access to data of a first object that has at least one temporally access controlled public attribute and a clock capable of measuring time independently of the clocks of other objects. A request to access a value of the public attribute of the first object is received. The value of the clock of the first object is compared with the value of the clock of at least one second object. If necessary, the clock values of the first and the second objects are synchronized. Access to the value of the attribute of the first object is granted. Also an arrangement and a computer program product are disclosed.

14 Claims, 8 Drawing Sheets

METHOD AND AN ARRANGEMENT FOR CONCURRENCY CONTROL OF TEMPORAL DATA

TECHNICAL FIELD OF INVENTION

The present invention relates to controlling concurrency in a system comprising temporal objects, e.g. in a distributed multi-user animation system.

BACKGROUND AND SUMMARY OF THE INVENTION

Various animation production software products are known in the art. Generally, the known solutions are essentially stand-alone single-user solutions. Therefore, there has been no need for allowing efficient multi-user access to, for example, on-line animation production services.

U.S. Pat. No. 6,369,821 discloses a single-user method and system for synchronizing scripted animations. The system provides synchronization services to synchronize actions of two or more interactive user interface characters that are displayed simultaneously.

The prior art solutions fail to disclose e.g. a solution to the problem of managing concurrency of separately controllable temporal objects in a distributed multi-user system. For example, the numerous concurrency control methods known from e.g. the area of data management systems are not applicable to concurrency control of temporal data of e.g. a multi-user animation production system.

An object of the present invention is to provide a method and system for efficient concurrency control of temporal objects, e.g. spatiotemporal objects, e.g. animated graphical objects. Preferably, the temporal objects are user controllable.

Another possible object of the present invention is to improve data consistency of spatiotemporal objects.

Yet another possible object of the present invention is to enable a number of users to work on the same animation scene in an efficient and convenient manner. For example, the object may be the minimization of the adverse effects, e.g. interruptions, of one user's work to the work of other users concurrently working on the same scene.

Still yet another possible object is the improvement of performance of distributed animation production system.

Still yet another possible object of the present invention is to hide from the user controlling and/or developing an animated object the complexity of dealing with temporal data, especially in an animated scene comprising multiple, possibly dependent temporal objects.

The first aspect of the present invention is a method for granting access to data of a first object having at least one temporally access controlled public attribute and a clock capable of measuring time independently of the clocks of other objects. The method is characterized in that the method has steps of receiving a request to access value of the public attribute of the first object, comparing the value of the clock of the first object with the value of the clock of at least one second object, synchronizing, if necessary, the clock values of the first and the second objects, and granting access to the value of the attribute of the first object.

The temporally access controlled public attribute of the object may have a temporal value history, e.g. a plurality of values each corresponding to a time value of the clock of the object. The temporal value history may be maintained for a period of time. Such period of time is herein called change history time window. Such time window may specify e.g. how much the clocks of two objects may differ from each other in order to be synchronizable. The history values of a temporally access controlled attribute, that are too old to fit in the change history time window may be purged, i.e. removed from memory.

In an embodiment of the present invention, the first and the second objects reside in different memory address spaces, e.g. in a first and a second computer device. The first object and the second object may thus be controlled by different users. The computer devices, e.g. terminals, may communicate with each other via a data communication network, suitably through a server computer. In one embodiment, the first and the second computer devices may be directly connected via a data communication network, e.g. in a peer-to-peer fashion.

The clock of an object may be controllable e.g. by the user controlling the object. For example, when user wants to decelerate an animated object from the real-time speed of the object, the user may decelerate the clock of the object. An object may also have means for requesting another object to control, e.g. accelerate, slow, halt or start, its clock. An object may also have means to control its own clock, e.g. accelerate, slow, halt or start its clock.

The temporal attribute may have e.g. a value that changes as a function of elapsed time.

The temporal attribute of the object may also be a public attribute. The temporal attribute may have e.g. spatial information, e.g. location and/or movement information in a multidimensional space. The object may be e.g. an animated object.

The step of synchronization may include e.g. temporarily slowing or halting the clock of at least one second object.

The first object may be associated with at least one second object based on a dependency relationship, e.g. spatial dependency between the first object and the second object. The spatial dependency may be determined e.g. by spatial distance or structural dependence between the objects. The dependency between the first object and the second object may be also determined based on the value of at least one public attribute of the first object or the second object.

In an embodiment, the access request to the attribute data is for read access received from the second object, and the step of synchronizing the clock of the first object with the clock of the second object may include the step of temporarily decelerating or stopping the clock of the second object.

In an embodiment, the value to be returned to the second object may be selected from the temporal value history of the attribute of the first object. The selection may be performed e.g. on the basis of the time of the clock of the second object.

In an embodiment, the object may have a timestamp of last write operation to the data of the object. The synchronization of the clocks may not be necessary if the timestamp of the last write operation is earlier than the time of the clock of the second object.

In an embodiment, the access request to the attribute data is for write access, the method may include an additional step of determining at least one second object belonging to an area of influence of the first object, and the step of synchronizing the clock of the first object with the at least one second object comprises step of temporarily decelerating or stopping the clock of the second object.

In an embodiment, at least one, possibly a plurality of access requests may occur within a context, implemented e.g. as a context object, that may be e.g. automatically created or specified by the user. Generally, the context has a set of objects whose clocks are controlled by the context according to the requirements of the context while the context is active.

For example, the objects may be temporarily required to synchronize their clocks. The access requests may be both read and write requests.

In an embodiment, the method may include additional steps of creating a context before the access request or as a part of processing the access request and releasing the context after the read and/or write operations within the context have been completed.

In an embodiment, a context may be automatically created upon a read access request. The context in this case may include e.g. the accessed object and the object requesting read access and the context controls that the clock of the accessed object is not behind the accessing object.

In an embodiment, a context may be automatically created upon a write access request. The context in this case may include e.g. the accessed object and the objects that are dependent from the accessed object and the context controls that the clock of the accessed object is not behind the dependent objects.

In an embodiment, a context may be created upon a "read for write" access request. The context in this case may have e.g. the at least one object to be accessed for read operation and the at least one object to be accessed for write operation. The context in this case may control that the clocks of those objects are in synch and possibly also proceeding at the same speed while the context is active.

The second aspect of the present invention is an arrangement for granting access to data of a first object residing in the memory address space a first computer device and the object has at least one temporally access controlled public attribute and a clock capable of measuring time independently of the clocks of other objects. The arrangement is characterized in that it has means for receiving a request to access value of the public attribute of the first object, comparing the value of the clock of the first object with the value of the clock of a second object residing in the memory address space of a second computer device, synchronizing, if necessary, the clock values of the first and the second objects, and granting access to the value of the attribute of the first object.

The arrangement may further have at least one server computer that is communicatively connectable to the first computer device and the second computer device. The server computer may be adapted to pass messages, e.g. clock synchronization requests and data read and write requests between the first and the second computer devices.

In an embodiment, there may be a plurality of server computers for spatial load distribution purposes.

The server computer may have means for maintaining and management of the objects of an animated space, determining dependencies between the objects of the animated space and providing a discovery service for finding objects belonging to an animated scene. The server computer may also have means for maintaining cache of data of the objects managed by the terminal computer devices of the arrangement. The cache may be e.g. a write-through cache. The server computer may also have means for managing the clocks of the objects managed by the terminal computer devices of the arrangement. For example, the server may temporarily stop a clock which has progressed too far ahead from the clocks of other objects. In this way, the server may manage the change history time window of an embodiment of the present invention.

The third aspect of the present invention is a computer software program executable on a computer device for granting access to data of a first object residing in the memory address space of the computer program, the first object has at least one temporally access controlled public attribute and a clock capable of measuring time independently of the clocks of other objects. The computer program is characterized in that it has computer executable instructions for receiving a request to access value of the public attribute of the first object, sending a request to a second computer program for comparing the value of the clock of the first object with the value of the clock of at least one second object residing in the memory address space of the second computer program, sending, if necessary, a request for synchronizing the clocks of the first and the second objects, and granting access to the value of the attribute of the first object.

Some embodiments of the invention are described herein, and further applications and adaptations of the present invention will be apparent to those of ordinary skill in the art.

BRIEF DESCRIPTION OF THE DRAWINGS

In the following, the invention is described in greater detail with reference to the accompanying drawings in which.

DETAILED DESCRIPTION

Figure 1:
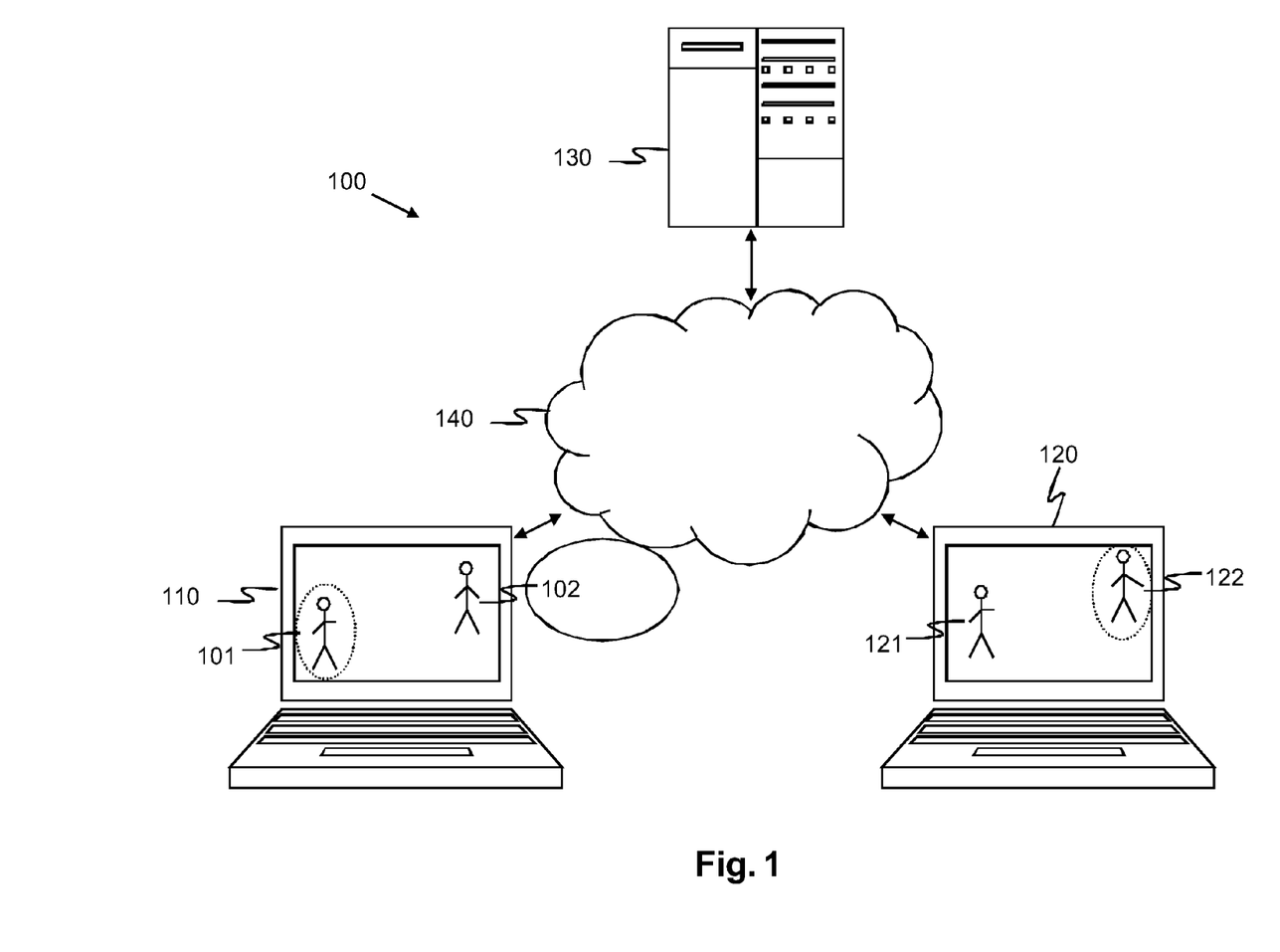
FIG. 1 shows an arrangement according to an embodiment of the present invention.

FIG. 1 depicts an exemplary arrangement according to an embodiment of the present invention. The arrangement 100 has a first terminal 110 and a second terminal 120 communicatively connected to a data communication network 140, e.g. Internet. The arrangement preferably also has a server computer 130 to which the terminals 110, 120 are communicatively connected via the communication network 140. Each terminal runs a software program suitable for producing an animated scene in collaboration with at least one other terminal. The user of a terminal 110 animates or controls at least one object 101 of the animated scene. The user of a terminal 110 also sees animated objects controlled by other users. For example, the user of the terminal 120 controls an object 122 of which a copy is shown as an object 102 on terminal 110. Similarly, the user of the terminal 120 may see a copy of object 101, controlled by the user of the terminal 110, as an object 121 depicted on the terminal 120. The circle around an animated object 101, 122 illustrates an object that is controllable by the user of the respective terminal 110, 120.

Each animated object preferably has a clock that is dedicated to the object. The clocks of different objects are independent from each other. The clock of the object affects the temporal parameters of the object. Preferably, the clock of the object is controllable by the user animating the object. While animating, the user may want to affect the animation speed of an object by slowing down the clock, by making the clock proceed in real time or by accelerating the clock. For example, the action of an animated object may be stopped for adjustments of the object by stopping the clock of the object.

The clocks of other objects typically proceed normally while the clock of one object is manipulated, i.e. slowed down, accelerated or stopped.

When a requesting object needs to access attribute data of an accessed object for a read operation, the clock of the requesting object may be compared with the clock of the accessed object. If the clock of the requesting object is ahead of the clock of the accessed object, the clock of the requesting object may be stopped until the clock of the accessed object has at least the same time. When the clocks have the same time or their times are within a specified time tolerance, the attribute value of the accessed object is freely accessible for reading. The mutual synchronization of the clocks of the plurality of objects is also herein called temporal synchronization.

Figure 2A:
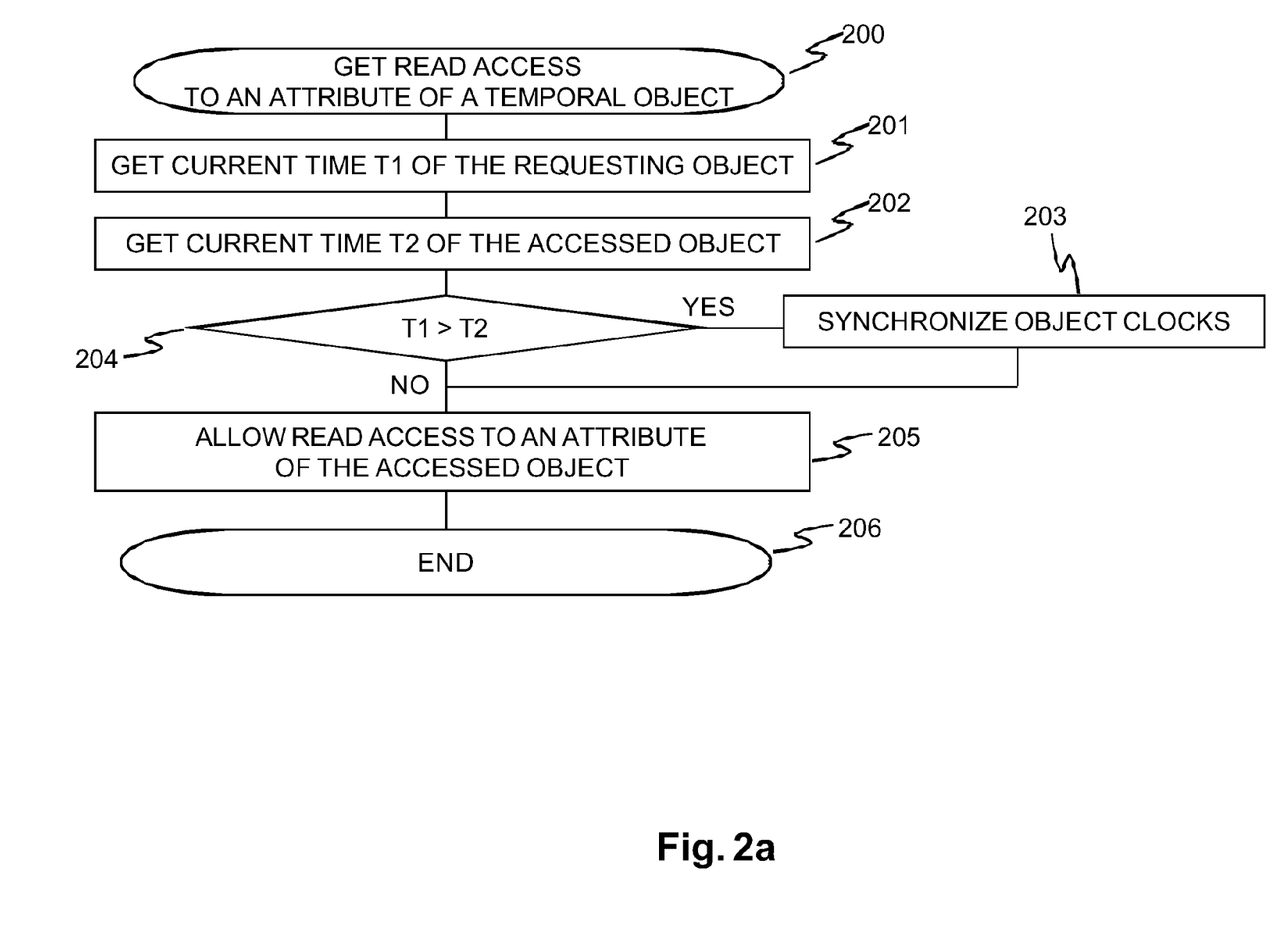
FIGS. 2a and 2b show an example about obtaining read access to an attribute of a temporal object according to an embodiment of the present invention.
Figure 2B:
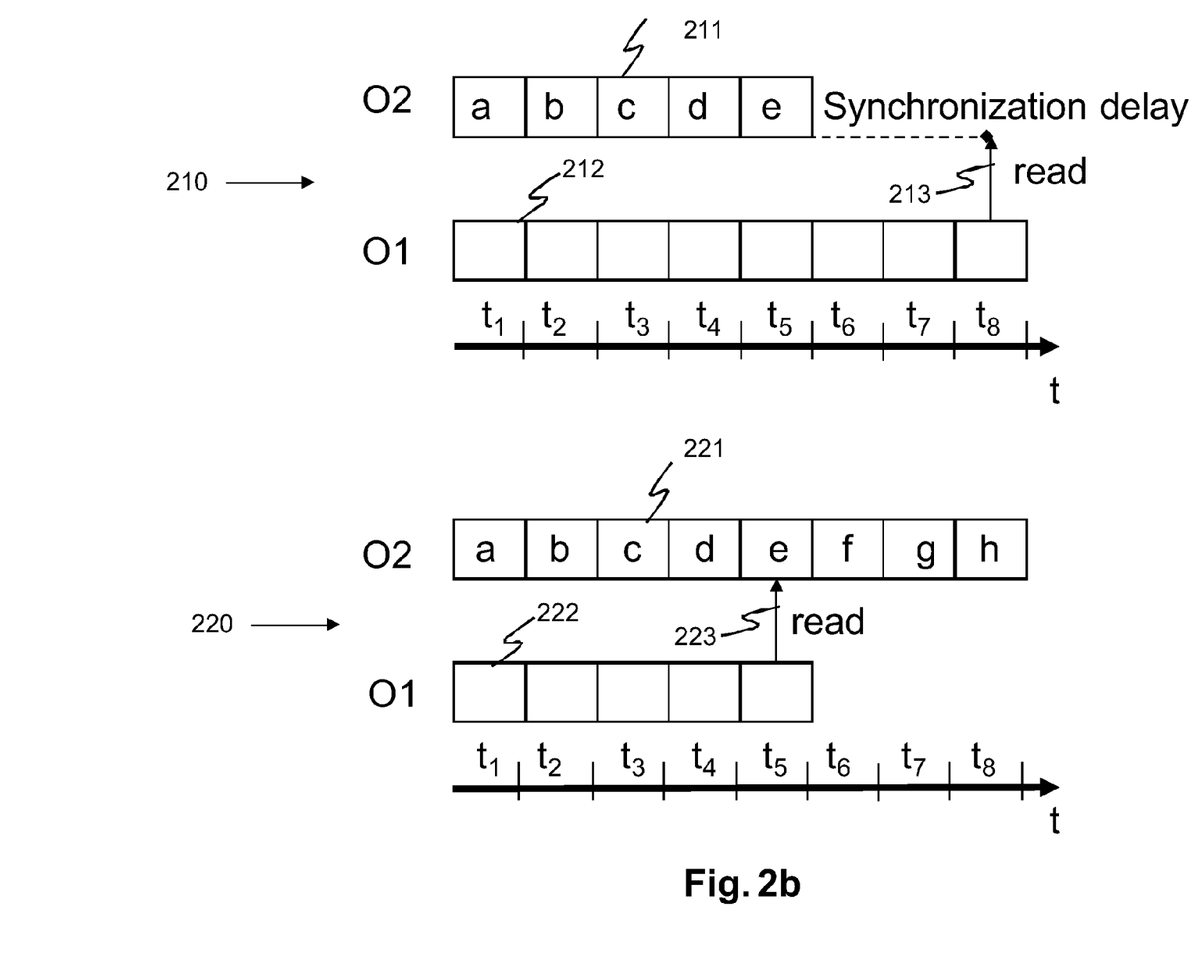
Figure 3:
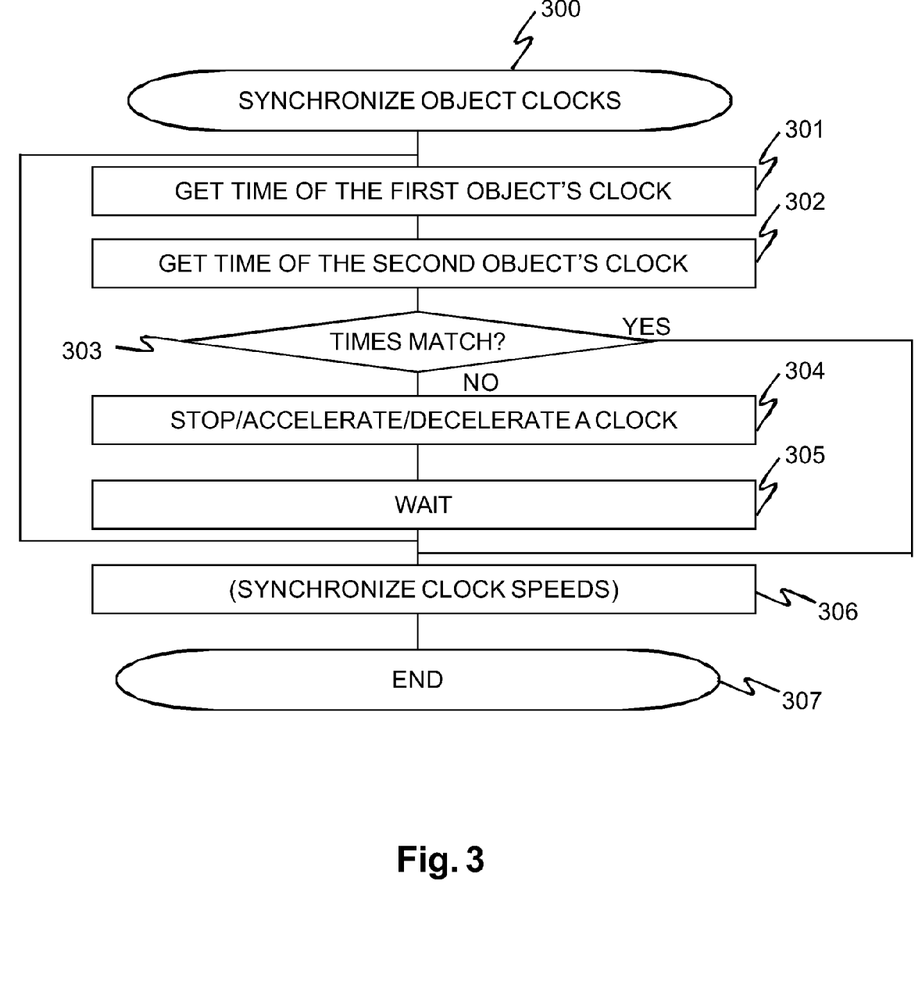
FIG. 3 shows an exemplary flow chart about synchronizing object clocks according to an embodiment of the present invention.

With reference to FIGS. 2a, 2b and 3, an example about allowing read access to attribute data 200 is provided. In an animation production system of an embodiment of the present invention, an object O1 being animated by a user U1 using a terminal T1 needs to query an attribute value of an object O2 being animated by a user U2 using a terminal T2. The queried attribute may be e.g. the current location of the object O2. In a scenario 210 the object O1, shown with reference number 212, sends the read request 213 to O2, shown with reference number 211, preferably via the animation server of the system. The read request may include the current time $t_8$ of the clock of the requestor object O1 212 (step 201). The requested object O2 compares the time of object O1 with its own time (step 202). As is shown in scenario 210, the time of O1 is ahead of the time of O2 (step 204). Now the object O2 sends in step 203 a clock synchronization request 300 (in FIG. 3) back to O1, again preferably via the server computer 130. In the clock synchronization operation, the time of the first object's clock (step 301) and the time of the second object's clock (step 302) are compared in step 303. If the times do not match (e.g. the clock of object O2 is behind the clock of object O1), the object O1 may stop (step 304) its clock and wait (step 305) until the clock of object O1 is synchronized with the clock of object O2. The requested object O2 may continue its operation normally while the requesting object O1 waits. After the clocks are synchronized, they may proceed e.g. at the same speed (step 306). The clock speed alignment step 306 is optional, however. Now, the object O1 informs object O2 about the completed synchronization (step 307) and object O2 returns (step 205 shown in FIG. 2) the requested attribute value to object O1. The read request of object O1 is now complete (step 206).

In scenario 220 of FIG. 2b, the clock of object O2 is ahead of the clock of object O1. According to the example shown, the clock of object O1, shown with reference number 222, is at a level $t_5$ whereas the clock of object O2 is at a level $t_8$. Now there is no need for clock synchronization. Therefore, the read request 223 occurred at the level $t_5$ is allowed immediately and the value of the requested attribute 221 is returned from the value history from the level $t_5$.

In one embodiment, the arrangement has also a master clock which time is set to be e.g. the time of the most advanced object clock. The master clock may be used e.g. when creating a new object and setting current time for that object. The master clock may also be useful when a mass synchronization of potentially large number of objects is needed.

An attribute of an object may have information about an area in space, e.g. an animated scene that is affected by a change of the attribute value. Such area is herein called an area of influence. An example of an area of influence in an animated scene 400 is provided in FIG. 4. Any of objects 403, 404 located in an area of influence 402 may be regarded as dependent from the attribute value of an object 401. An attribute that has dependent objects may not be updated without temporal synchronization of the object containing the attribute 401 and the dependent objects 403, 404. The objects of a temporal scene, e.g. an animated scene, may thus be divided into two groups: those which belong to an area of influence, i.e. objects 403 and 404 of an object attribute and those which do not, i.e. an object 405. An object may belong to an area of influence also based on some other criteria than its location in space. For example, an object may be explicitly defined to be always being dependent from another object when visible anywhere in the animation scene 400.

Figure 4:
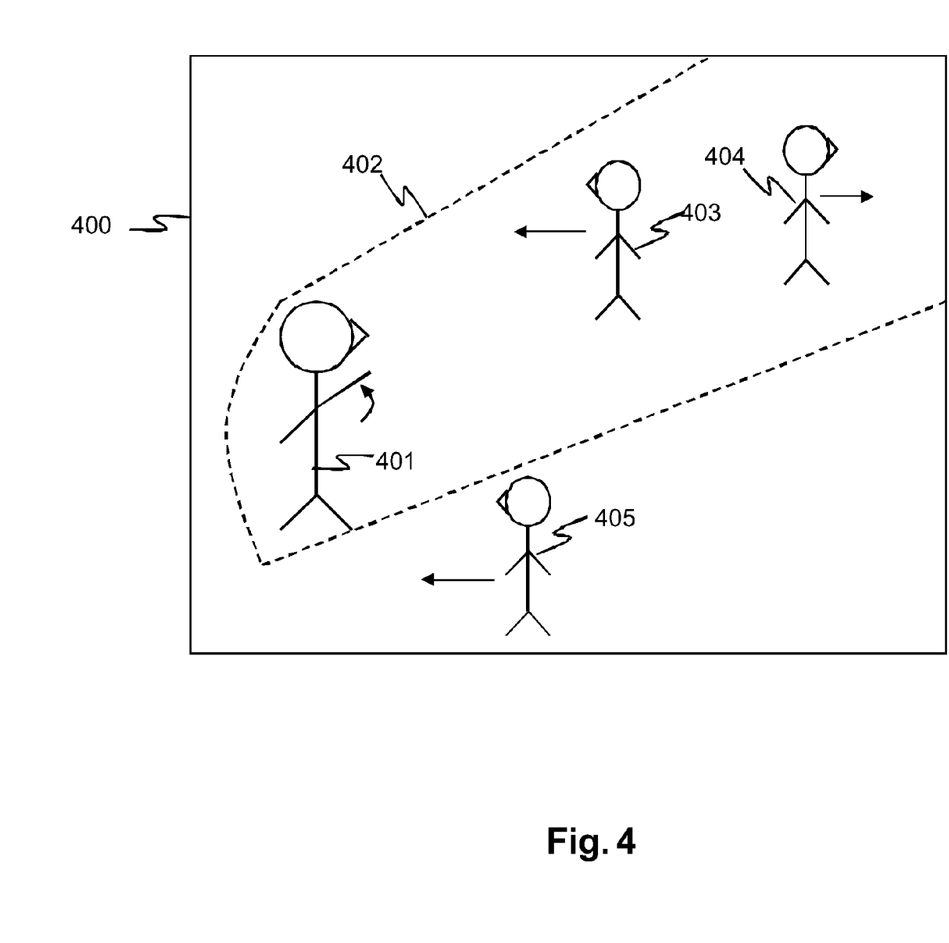
FIG. 4 shows an exemplary animation scene of an embodiment of the present invention.

The area of influence 402 of the object 401 attribute may vary e.g. as the result of actions of various objects of the animation scene. Therefore, objects may leave or enter the area of influence in a dynamic fashion. However, area of influence typically does not change during a temporal synchronization operation.

In an embodiment, an object may allow write access to its attributes only after the synchronization of clocks has occurred.

Figure 5A:
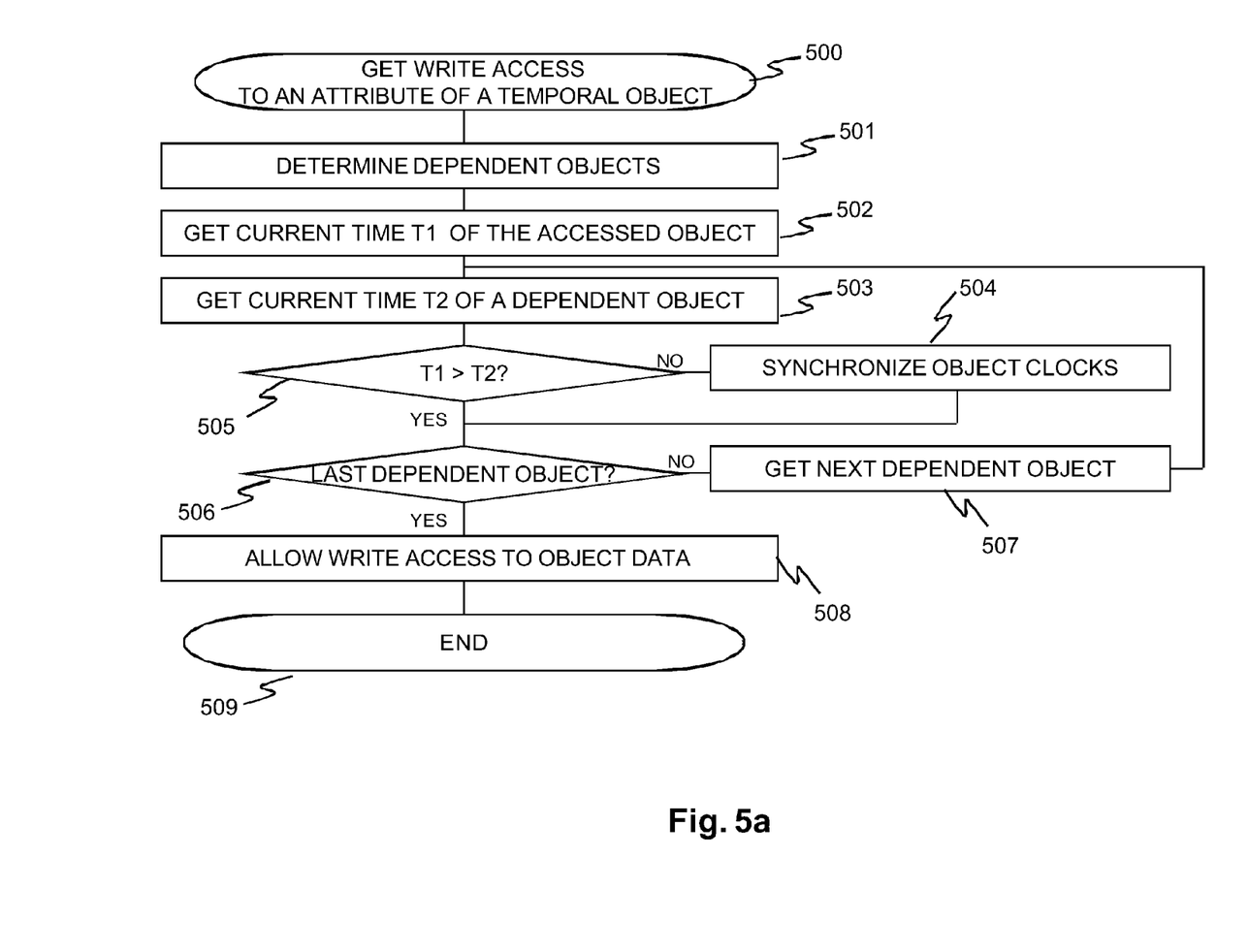
FIGS. 5a and 5b show an example about obtaining write access to an attribute of a temporal object according to an embodiment of the present invention.
Figure 5B:
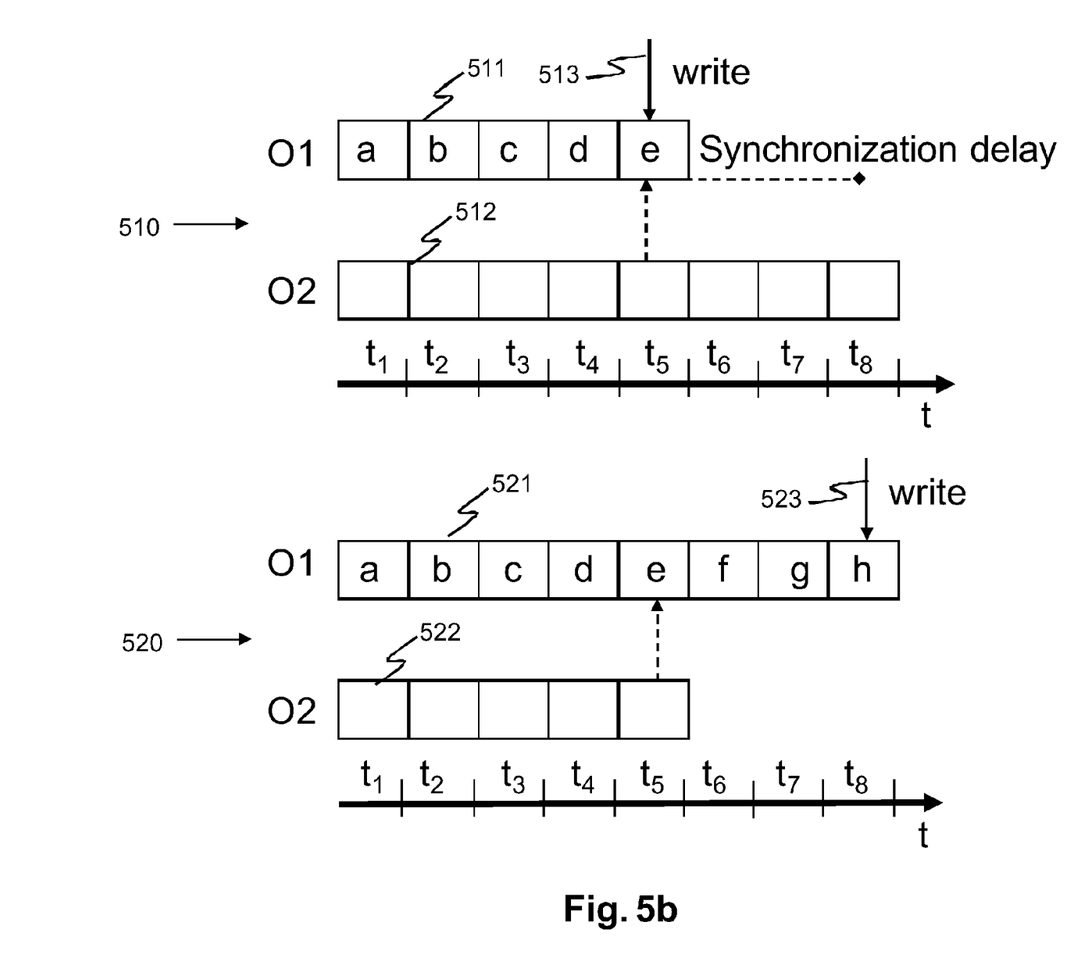

A reference is now made to FIGS. 5a and 5b. When an object needs to access an attribute of an object for a write operation 500, objects being dependent from the object need first to be determined (step 501). Then, the current time of the clock of the accessed object (step 502) and the current time of the clock of a dependent object (step 503), i.e. objects belonging to the area of influence of the requested object, are obtained and a comparison between the clocks of the object and its dependent objects is performed (step 505). The clocks of those objects of the area of influence, which are ahead of the clock of the accessed object, may be synchronized with the clock of the accessed object (step 504). The synchronization is performed, preferably in parallel to the clocks of all dependent objects (steps 506, 507). The objects that have been synchronized with the accessed object or that do not need synchronization may proceed normally. Once the clock of the requested object has proceeded to the level of the most advanced clock of the objects of the area of influence, the write access may be provided to the data of the requested object (step 508). In some embodiments the data written to the accessed object may be delivered to the objects of the area of influence.

Below is an example about allowing write access to attribute data provided. In an animation production system of an embodiment of the present invention, an attribute value of object O1 (e.g. 401 in FIG. 4) needs to be set or updated. The attribute value of the object may be e.g. the current direction of movement of the animated object. The attribute of object O1 has object O2 (e.g. 403 in FIG. 4, animated e.g. by user U2 on terminal T2) and object O3 (e.g. 404 in FIG. 4, animated e.g. by user U3 on terminal T3) in its area of influence. When object O1 receives the request for updating the value of its attribute, the object O1 checks which objects currently belong to the relevant area of influence. For example, objects residing within a pre-determined distance from object O1 to the direction of gaze of the object O1 (assuming that object O1 represents an animated person) may belong to the area of influence. In this example, objects O2 and O3 meet the criteria and thus belong to the area of influence of object O1. In the first scenario 510 (see FIG. 5b), the clock of object O1, shown as reference number 511, is behind the clock of the dependent object O2, shown as reference number 512. Therefore, before allowing write access to its attribute data, object O1 needs to perform the temporal synchronization with the clocks of object O2, reference number 512, and object O3 (e.g. object 404 in FIG. 4) upon the write request 513. More specifically, object O1 must ensure that the clocks of objects O2 and O3 are not ahead of the clock of object O1 when the attribute of object O1 is updated. Object O1 thus sends a synchronization request to both object O2, reference number 512, and object O3. If the clock of object O2 is ahead of the clock of object O1, object O2 stops its clock until the clock of object O1 has proceeded to the same level. Generally, the animation of the user interface instance of an object stops when the clock of the object is stopped. Similarly, object O3 stops its clock until the clock of object O1 has reached the same level. When both object O2 and object O3 have reported completed synchronization back to object O1, the attribute value of object O1 may be updated. In the shown example, the timestamp of the updated data will be time $t_8$. Typically, the animation scene contains also additional objects, e.g. object O4 (e.g. object 405 in FIG. 4), which do not belong to the area of influence of object O1. Those objects are not affected by the synchronization operation. Therefore, the object O4 may be freely animated e.g. by user U4 on terminal T4 while the attribute of object O1 is being updated.

In the scenario 520 of FIG. 5b, the clock of the object O1, reference number 521, is ahead of the clock of the dependent object O2, reference number 522. Therefore, the write access requested 523 may immediately be granted to the attribute data of object O1.

Figure 6:
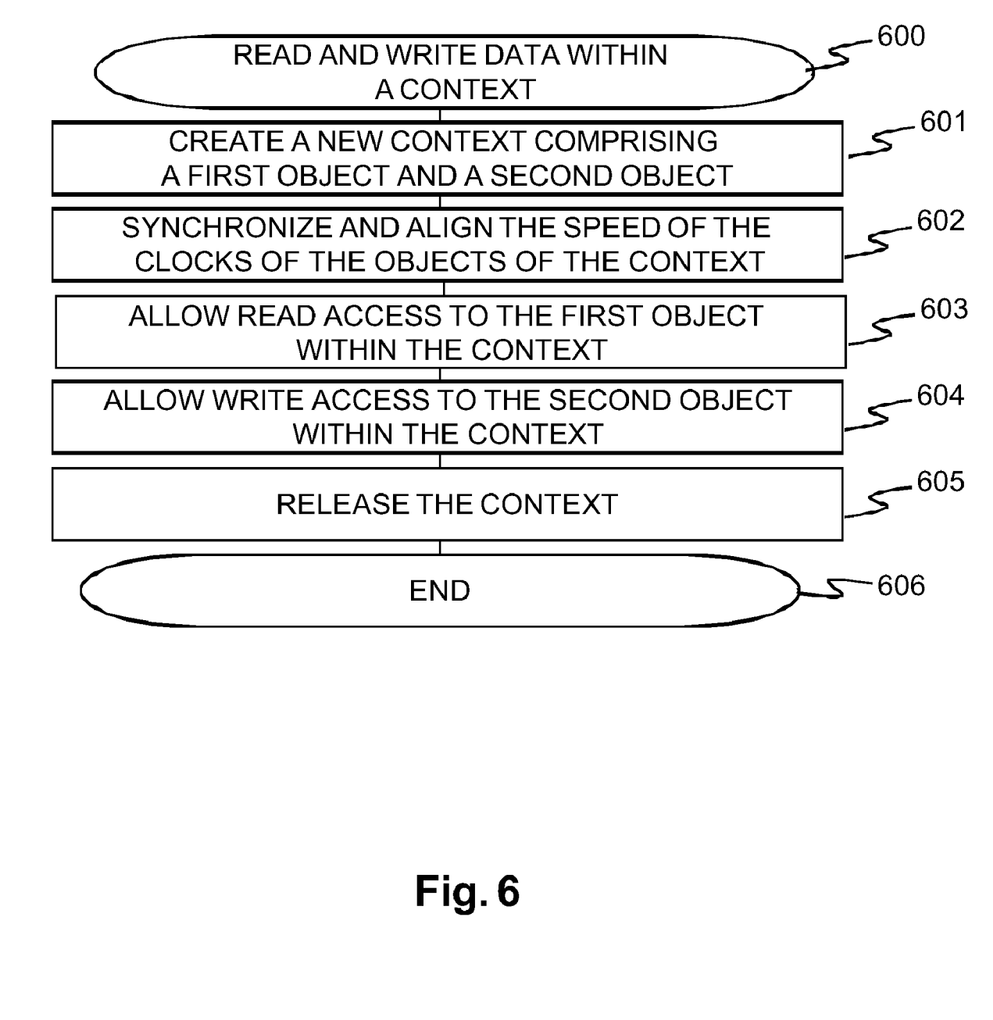
FIG. 6 depicts an exemplary method of reading and writing data of a plurality of objects within a context according to an embodiment of the present invention.

FIG. 6 depicts a scenario where some data is read from a first object and data of a second object is updated based on the read data of the first object. For example, the current state of an animated object may affect the new state of another animated object. In such scenario, a new context is created and the first object and the second object are included into this context (step 601). Once the formation of the context is complete, the clocks of the objects within the context are synchronized and their speed is aligned (step 602). The objects of the context thus share the same time, herein called the "context time." If necessary, the context time may be controlled e.g. by a user, e.g. the one who requested creation of the context. For example, the clocks of the objects of the context may be stopped while the objects are accessed for read and/or write operations. Now it is possible to a request read access 603 to temporally controlled attribute data of an object within the context. The read request may be processed using e.g. the method of FIG. 2a. Preferably, the most recent version of the data is returned to the requestor. Within the same context, another request, for example a write request 604, is then performed, e.g. using the method shown in FIG. 5a. The data to be written to the second object may depend from the data read in step 603. Once all the read and write operations of the context have been completed, the context may be released (step 605) which completes (step 606) the use of the context. Now the objects, including the clocks of the objects, are again freely controllable by the users of the objects.

When performing the temporal synchronization operations, a pre-defined time tolerance may be applied to the synchronization operation. The tolerance may be determined e.g. based on the properties, e.g. data transfer speed or network delay of the data communication network used. For example, if a tolerance of 0.5 seconds is applied, the clocks are considered to be in synch if their time differs less than 0.5 seconds from each other. A separate time tolerance value may also be set for a specified attribute of an object.

The various embodiments of the present invention provide numerous possible advantages over the solutions of the prior art. The present invention allows for an efficient concurrency control of separately controlled temporal objects in a relatively simple, yet powerful manner. Because of the disclosed concurrency control method, data consistency of a spatiotemporal object, which may be dependent from data of other temporal objects, may be preserved in a reliable manner. A properly working concurrency control solution also allows a number of users work on e.g. the same animation scene in an efficient and convenient manner. Finally, the performance of distributed animation production system may be improved because only those objects of an animated scene, that are affected by a read or write operation, are, preferably, affected by the concurrency control operations.

To a person skilled in the art, the foregoing exemplary embodiments illustrate the model presented in this application whereby it is possible to design different methods and arrangements, which in obvious ways to the expert, utilize the inventive idea presented in this application.

While the present invention has been described in accordance with preferred compositions and embodiments, it is to be understood that certain substitutions and alterations may be made thereto without departing from the spirit and scope of the following claims.

The invention claimed is:

1. A method for granting access to data of an object comprising at least one temporally access controlled public attribute and a clock capable of measuring time independently of clock of other object, comprising:
   displaying a first object in a first terminal, the first object being associate with a first clock,
   displaying a second object in a first terminal, the first object being associate with a second clock,
   displaying a copy of the second object in the first terminal, wherein the copy of the second object being located in an area of influence of the first object,
   the first terminal and the second terminal being in communication with one another,
   receiving a request to access a value of the public attribute of the first object,
   comparing a value of the first clock of the first object with a value of the second clock of the second object,
   when the second clock is ahead of the first clock, synchronizing the value of the first clock of the first object and the value of the second clock of the second object, granting access to the value of the public attribute of the first object, wherein synchronizing comprising temporarily decelerating or stopping the second clock of the second object, and
   when the second clock is behind the first clock, granting access to the value of the public attribute of the first object without synchronizing the first clock and the second clock.

2. A method according to claim 1 wherein the method, further comprises the step of residing the first and the second objects in different memory address spaces.

3. A method according to claim 1 wherein, the method further comprises the step of a user, controlling the first object, controlling the first clock of the first object.

4. A method according to claim 1, wherein the method further comprises the step of providing the first object as an animated object comprising spatial information in a multi-dimensional space.

5. A method according to claim 1 wherein the step of synchronizing comprises sending a request to temporarily slow down or halt the second clock of the second object.

6. A method according to claim 1 wherein the method further comprises associating the first object with the second object based on a dependency relationship between the first object and the second, object.

7. A method according to claim 6 wherein the method further comprises determining the dependency relationship between the first object and the second object based on a value of at least one public attribute of the first object or the second, object.

8. A method according to claim 1 wherein
the access request to the attribute data is for read access received from the second object, and
the step of synchronizing the first clock of the first object with the second clock of the second object comprises a step of temporarily decelerating or stopping the second clock of the second object.

9. A method according to claim 8 wherein a value to be returned to the second object is selected from a temporal value history of the public attribute of the first object on a basis of a time of the second clock of the second object.

10. A method according to claim 1 wherein
the access request to the attribute data is for write access.

11. A method according to claim 1 wherein the access request occurs within a context that comprises a set of objects which clocks are controlled according to requirements of the context.

12. A system for granting access to data of a first object residing in a memory space of a first computer device, the first object comprising at least one temporally access controlled public attribute and a first clock capable of measuring time independently of clocks of other objects, comprising:
means for display the first object in a first computer device,
means for display a second object in a second computer device, the second object being associate with a second clock,
means for display a third object in a third computer device, the third object being associate with a third clock,
means for displaying a copy of the second object and a copy of the third object in the first computer device,
means for receiving a request to access a value of the public attribute of the first object,
wherein the copy of the second object being located in an area of influence of the first object, the copy of the third object being located outside the area of influence of the first object,
means for comparing a value of the first clock of the first object with a value of the second clock of a second object and a value of the third clock of the third object,
when the first clock being behind the second clock,
means for synchronizing the value of the first clock of the first object and the values of the second clock of the second object,
means for granting access to the value of the public attribute of the first object, and
means for granting access to the value of the public attribute of the first object without synchronizing the value of the third clock with value of the first clock.

13. A system according to claim 12 wherein the system further comprises means for passing synchronization requests between the first object of the first computer device and the second object of the second computer device, wherein a server computer that is communicatively connectable to the first computer device and the second computer device for passing said synchronization requests.

14. A computer program executable on a terminal device for granting access to attribute data of a first object residing in a memory address space of the computer program, the first object comprising at least one temporally access controlled public attribute and a first clock capable of measuring time independently of clocks of other objects, the computer program further comprises computer executable instructions for:
displaying the first object in a first terminal, the first object being associated with the first clock,
displaying a second object in a second terminal, the second object being associated with a second clock,
displaying a copy of the second object in the first terminal, wherein the copy of the second object being located in an area of influence of the first object,
the first terminal and the second terminal being in communication with one another,
receiving a request to access value of the public attribute of the first object,
sending a request to a second computer program for comparing a value of the first clock of the first object with a value of a second clock of a second object residing in the memory address space of the second computer program,
when the second clock being ahead of the first clock,
sending a request to the second computer program for synchronizing the first clock of the first object and the second clock of the second object, wherein synchronizing comprising temporarily decelerating or stopping the second clock of the second object,
granting access to the value of the public attribute of the first object, and
when the second clock being behind the first clock,
granting access to the value of the public attribute of the first object without synchronizing the first clock with the second clock.

* * * * *